No. 854,451. PATENTED MAY 21, 1907.
M. BIDEAU.
JOINTED SPINDLE AXLE.
APPLICATION FILED FEB. 20, 1907.

WITNESSES:
W. M. Avery
J. P. Davis

INVENTOR
Maurice Bideau
BY
ATTORNEYS

UNITED STATES PATENT OFFICE.

MAURICE BIDEAU, OF PARIS, FRANCE.

JOINTED-SPINDLE AXLE.

No. 854,451.    Specification of Letters Patent.    Patented May 21, 1907.

Application filed February 20, 1907. Serial No. 358,363.

*To all whom it may concern:*

Be it known that I, MAURICE BIDEAU, a citizen of the Republic of France, residing at Paris, 16 Cité d'Antin, agent of the Société Ame des Aciéries et Forges de Ferminy, have invented certain new and useful Improvements in Jointed-Spindle Axles, of which the following is a specification.

My invention relates to axles having jointed spindles, chiefly designed to receive the steering wheels in a motor-car, and the object of the invention is to so mount or fit the said axle that it will allow of a ball bearing or washer being arranged between the body part of the axle and the spindle around the stud of the vertical joint of these parts in such a manner as to avoid any injurious movement out of the prependicular with respect to the said stud.

Figure 1:
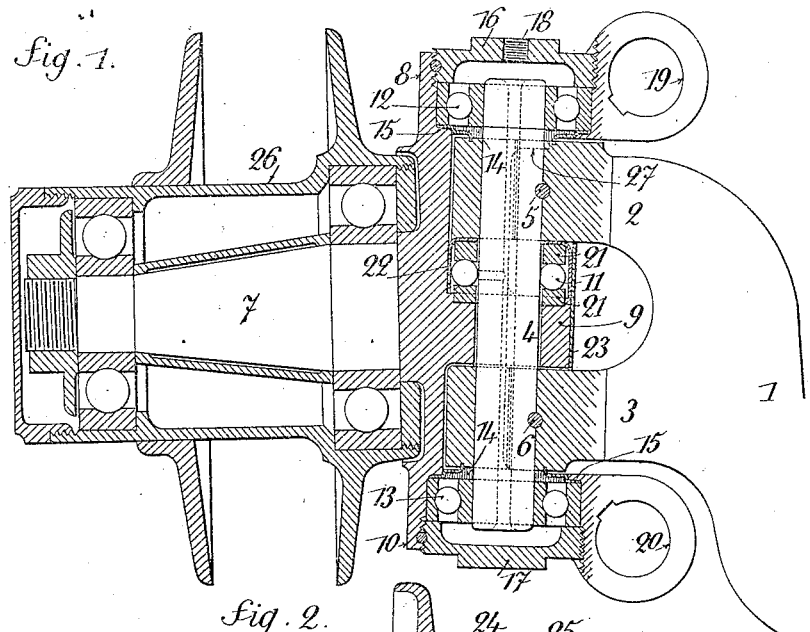
Figure 2:
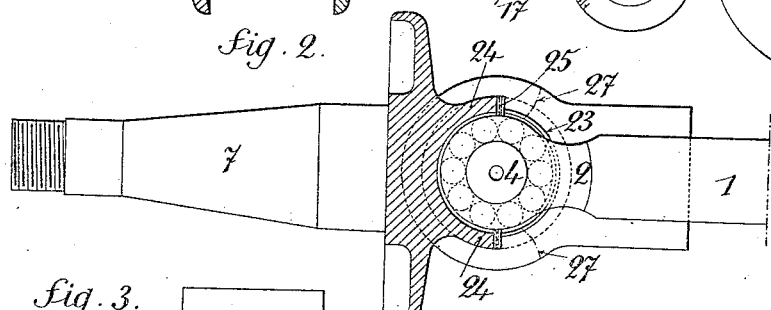
Figure 3:
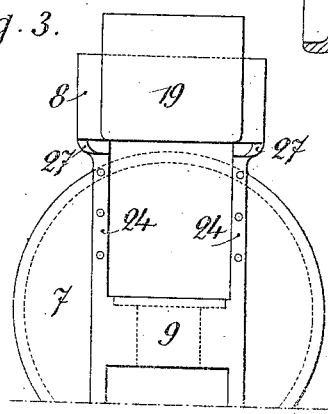

One embodiment of this invention is shown in the accompanying drawing in which:

Figure 1 is a vertical sectional view on the axial line of the spindle, Fig. 2 is a plan view, partly in section on the axial line of the spindle, partly on a plane above the body part of the axle; and Fig. 3 is an elevation of the inner side of the spindle, the body part of the axle and the joint stud being removed.

The body part 1 of the axle terminates in a helm in two integral parts 2 and 3, through which passes a vertical joint stud 4. The upper part 2 of the helm transmits to the spindle the vertical pressure resulting from the load on the axle. The lower part 3 relieves the upper part 2 through its connection with the latter by means of the stud 4, doweled at 5 and 6, in each of the said parts. The parts 2 and 3 are, furthermore, subjected to the strain due to the reversing coupling on account of the distance there is between the plane of the wheel and the joint stud 4; the part 2 operating in favor of the compression and the part 3 in favor of the extension.

The spindle 7 is provided, toward the axle, with three eyelets or apertures 8, 9, 10 which surround the stud 4, and between which the parts 2 and 3 of the helm or block are engaged. The eyelets 8 and 10 are for the purpose of resisting the reversing coupling, while the central eyelet 9 is only subjected to the vertical pressure due to the load on the axle, and transmitted by a crown of balls 11 located in a ball-race between the part 2 and the eyelet or aperture 9. The eyelets 8 and 10 bear laterally on the joint stud 4 through the medium of ball or roller bearings 12 and 13 or of simple bronze or other journals.

The frictional parts and the ball bearings are protected against dirt and dust by felt or other washers 14 and any kind of suitably shaped metal washers 15. Furthermore, stoppers or caps 16, 17, secured in any suitable manner on the eyelets or apertures 8 and 10, as for instance by being screwed and doweled maintain the ball-bearings in place and close the orifices of the said apertures.

The upper stopper or cap is provided with a screw-threaded hole 18, in which is secured in place a lubricator (not shown), and the stud 4 is pierced by suitable ducts which distribute the lubricant as and where it may be required.

The eyelets 8 and 10 carry pierced bosses 19 and 20 designed to receive the steering and connecting levers.

The boss 19 only exists generally on the right hand spindle (when the steerage is at the right) and receives the steering lever.

The boss 20, which receives the connecting lever, is formed on both the right hand and the left hand spindles.

The boss 19 may be dispensed with when the constructor uses a special double lever for both steerage and connection purposes.

The swiveling may be done either on the balls 11 in suitable ball-races 21, as shown in the drawing, or on bronze or other metal washers. This part is covered by a cap 22 and the whole is again protected by a jacket of suitable shape 23, screwed or otherwise secured to the edges 24 of the spindle, with the interposition of leather or other pads 25, so as to fill up the space comprised between the eyelet or aperture 9 and the part of the helm or block and make an air-tight joint. The hubs 26 of the wheels may be provided with ball or roller bearings, or with bronze or other journals. Two bosses 27 are formed on the upper eyelet 8, of the spindle, in order to limit the point when impinging against the body part of the axle. They are in a position out of reach of the pebbles of the road which, if the bosses were at the lower part, might get in between and interfere with the steerage.

On account of the above described arrangements, the elements of the swivel can be so fitted in between the two parts or branches 2, 3 of the helm or block as to avoid any injurious movement out of the perpendicular on or with respect to the joint pin or stud 4. The strain of the reversing coupling falls on the joint stud 9 quite close to the sections of the same which are embedded in the body part of the axle and the outside of the said sections.

All the frictional parts can be easily and efficiently protected.

My invention can, by changing the particular arrangements of the axle in each particular case, be rendered suitable for vehicles of any motive power, whether light or heavy motor cars, racing or touring automobiles, drags, busses, and the like.

Claims.

1. In an axle having jointed spindles for motor-cars, the combination of the body part of the axle terminating at each end in a helm or block having two integral parts or branches, a spindle having three eyelets or apertures, the spaces between the said eyelets or apertures being adapted to receive the said parts or branches respectively, and a stud passing through the three eyelets and the two branches.

2. In a jointed spindle axle for motor-cars, the combination of the body part of the axle having at each end a helm or block having two integral parts or branches, a stud securely fixed in the said parts or branches, a spindle having three eyelets so arranged as to loosely surround the said stud, ball-bearings arranged in the two outer or end eyelets around the stud, the two parts or branches of the helm or block being engaged in the spaces between the three eyelets respectively and ball-bearing between the middle or median eyelet and the upper part or branch to transmit the vertical load of the axle to the spindle.

3. In a jointed spindle axle, the combination of the body part of the axle, of a helm or block having two parts or branches at each end of the said body part, a spindle having three eyelets, a stud passing through these three eyelets and the two parts or branches of the helm or block, the said parts or branches being engaged between the said eyelets, ball-bearings arranged in the outer or end eyelets around the stud, caps or stoppers adapted to close the outer orifices of the outer or end eyelets; a longitudinal oil channel or duct in the stud establishing a communication between the chambers of the caps, a ball-bearing between the middle or median eyelet and the upper part or branch of the helm or block, and a transversal oil hole in the stud establishing a communication between the said oil channel or duct and the said ball-bearing.

In testimony that I claim the foregoing as my invention, I have signed my name in presence of two subscribing witnesses.

MAURICE BIDEAU.

Witnesses:
 CAMILLE BLÉTRY,
 HANSON C. COXE.